(12) United States Patent
Zhang

(10) Patent No.: US 12,387,635 B1
(45) Date of Patent: Aug. 12, 2025

(54) MOUNTING BRACKET OF WIND-DRIVEN PLATE

(71) Applicant: Haitao Zhang, Jinhua (CN)

(72) Inventor: Haitao Zhang, Jinhua (CN)

( * ) Notice: Subject to any disclaimer, the term of this patent is extended or adjusted under 35 U.S.C. 154(b) by 0 days.

(21) Appl. No.: 19/018,585

(22) Filed: Jan. 13, 2025

(30) Foreign Application Priority Data

Nov. 8, 2024 (CN) .......................... 202422726163.X

(51) Int. Cl.
*G09F 19/02* (2006.01)
*F16M 13/02* (2006.01)

(52) U.S. Cl.
CPC ............. *G09F 19/02* (2013.01); *F16M 13/02* (2013.01)

(58) Field of Classification Search
CPC ................................ G09F 19/02; F16M 13/02
See application file for complete search history.

(56) References Cited

U.S. PATENT DOCUMENTS

| | | | | |
|---|---|---|---|---|
| 1,012,560 A * | 12/1911 | Keller | .................... | G04B 21/08 D10/116.1 |
| 3,089,269 A * | 5/1963 | McKiernan | ............... | G09F 7/06 211/1 |
| 3,118,207 A * | 1/1964 | Breslow | ................. | A47H 13/00 24/304 |
| 3,224,113 A * | 12/1965 | Goldsholl | ................. | G09F 5/04 402/19 |
| 3,258,870 A * | 7/1966 | Offenhauer | ............... | G09F 7/06 40/622 |
| 3,315,392 A * | 4/1967 | Edwards | ................... | G09F 7/08 40/622 |
| 3,871,524 A * | 3/1975 | Helf | ........................ | A47F 7/163 248/303 |
| 3,953,065 A * | 4/1976 | Shannon, Jr. | ......... | G03F 7/3064 211/113 |
| 4,063,648 A * | 12/1977 | Fuller | ..................... | A47F 7/163 40/607.13 |
| 4,179,144 A * | 12/1979 | Henderson | ............ | E05B 65/006 292/202 |
| 4,505,061 A * | 3/1985 | Neuburger | ............. | H02B 15/04 40/605 |
| 4,694,596 A * | 9/1987 | Fast | .......................... | G09F 3/04 40/628 |
| 5,137,158 A * | 8/1992 | Brockway | ................ | B60R 7/02 211/DIG. 1 |

(Continued)

*Primary Examiner* — David R Dunn
*Assistant Examiner* — Christopher E Veraa

(57) ABSTRACT

The present invention discloses a mounting bracket of a wind-driven plate, and relates to the field of decoration. The mounting bracket includes brackets and mounting mechanisms. When the wind-driven plate is required to be turned over, it is only necessary to rotate the first connecting pieces and the second connecting pieces of the mounting mechanisms relative to the brackets in a first direction, and then the wind-driven plate rotates relative to the second connecting pieces around a second direction, so that the wind-driven plate can be turned over and can be hung on the second connecting pieces. According to the present invention, the wind-driven plate can be rotated and turned over through two rotating motions of the wind-driven plate, so high flexibility is achieved, and a user can make corresponding display patterns according to the actual situation, thereby achieving a good display effect.

9 Claims, 10 Drawing Sheets

(56) References Cited

U.S. PATENT DOCUMENTS

| | | | | |
|---|---|---|---|---|
| 5,428,914 | A * | 7/1995 | Whitehouse | G09F 15/0006 |
| | | | | 40/594 |
| 5,441,239 | A * | 8/1995 | Watson | E04H 17/06 |
| | | | | 40/622 |
| 5,444,929 | A * | 8/1995 | Joseloff | G09F 1/10 |
| | | | | 40/657 |
| 5,819,457 | A * | 10/1998 | Parker | G09F 23/0066 |
| | | | | 40/620 |
| 5,977,481 | A * | 11/1999 | Worrell | H02G 3/14 |
| | | | | 220/241 |
| 5,992,072 | A * | 11/1999 | Garfinkle | G09F 3/202 |
| | | | | 40/642.02 |
| 6,546,655 | B1 * | 4/2003 | Hillstrom | G09F 7/02 |
| | | | | 40/611.13 |
| 7,059,482 | B2 * | 6/2006 | Reid | A47F 7/163 |
| | | | | 211/118 |
| 7,424,958 | B1 * | 9/2008 | Eley | A47F 5/0815 |
| | | | | 211/70.6 |
| 7,845,501 | B1 * | 12/2010 | Fosburg | B25H 3/04 |
| | | | | 211/70.6 |
| 9,144,349 | B2 * | 9/2015 | Groll | A47J 45/02 |
| 10,087,978 | B2 * | 10/2018 | Wall | B25H 3/04 |
| 10,869,561 | B2 * | 12/2020 | Arradondo | A47F 5/0006 |
| D1,056,563 | S * | 1/2025 | Long | D6/553 |
| 2011/0314714 | A1 * | 12/2011 | Baxendale | A47F 7/14 |
| | | | | 40/606.03 |

* cited by examiner

MOUNTING BRACKET OF WIND-DRIVEN PLATE

CROSS-REFERENCE TO RELATED APPLICATIONS

The present application claims priority to Chinese Patent Application No. 202422726163X, filed on Nov. 8, 2024, the entire disclosure of which is incorporated herein by reference.

TECHNICAL FIELD

The present invention relates to the field of decoration, and in particular to a mounting bracket of a wind-driven plate.

BACKGROUND

A wind-driven plate is a decoration material, and has become more and more popular in architecture and interior design. The wind-driven plate can swing slightly under the action of wind and produce a dynamic visual effect. The wind-driven plate usually adopts modular design, and is convenient to mount and dismount rapidly and suitable for various decorative scenarios.

The mounting structure of the existing wind-driven plate has the following problems: a part connected to the wind-driven plate is fixed, so that the wind-driven plate cannot be turned over, the wind-driven plate only can display one color, a user cannot make corresponding display patterns according to the actual situation, the displayed content is single and the decorative effect is not good.

SUMMARY

Embodiments of the present invention provide a mounting bracket of a wind-driven plate, so that the wind-driven plate can be turned over, a user can make corresponding display patterns according to the actual situation, and high flexibility is achieved.

The present invention provides a mounting bracket of a wind-driven plate, including brackets and a plurality of mounting mechanisms arranged on the brackets, where the mounting mechanisms include first connecting pieces and second connecting pieces; the first connecting pieces are rotatably arranged on the brackets around a first direction; the second connecting pieces are connected to the first connecting pieces; the second connecting pieces are movably connected to the wind-driven plate; the wind-driven plate is capable of rotating on the second connecting pieces around a second direction; and the first direction and the second direction intersect in a plane.

The mounting bracket of the wind-driven plate provided by the present invention has the following beneficial effects.

The mounting bracket provided by the present invention includes the brackets and the mounting mechanisms. When the wind-driven plate is required to be turned over, it is only necessary to rotate the first connecting pieces and the second connecting pieces of the mounting mechanisms relative to the brackets in a first direction, and then the wind-driven plate rotates relative to the second connecting pieces around a second direction, so that the wind-driven plate can be turned over and can be hung on the second connecting pieces. According to the present invention, the wind-driven plate can be rotated and turned over through two rotary motions of the wind-driven plate, so high flexibility is achieved, colors displayed by the wind-driven plate can be diversified, and a user can make corresponding display patterns according to the actual situation, thereby achieving a good display effect.

BRIEF DESCRIPTION OF THE DRAWINGS

Various other advantages and benefits will become apparent to those skilled in the art by reading the detailed description of the preferred embodiments below. The accompanying drawings are used to only illustrate the preferred embodiments and are not considered to limit the present invention. In addition, in all the accompanying drawings, a same reference symbol is used to represent a same part. In the drawings.

DETAILED DESCRIPTION OF THE EMBODIMENTS

The features and exemplary embodiments of each aspect of the present invention will be described below in detail. To make the objectives, technical solutions and advantages of the present invention more clearly, the following further describes the present invention in detail with reference to the accompanying drawings and the specific embodiments. It should be understood that the specific embodiments described herein are only used for explaining the present invention, and are not intended to limit the present invention. For a person skilled in the art, the present invention may be implemented without some of these specific details. The following descriptions of the embodiments are merely intended to provide examples of the present invention to better understand the present invention.

It should be noted that in this specification, relational terms such as first and second are only used to distinguish one entity or operation from another entity or operation, and do not necessarily require or imply that there is any such actual relationship or order between these entities or operations. Furthermore, the terms "comprise", "include" or any other variant thereof are intended to cover non-exclusive inclusion, so that a process, method, object or device including a series of elements not only includes those elements, but also includes other elements not explicitly listed, or also includes elements inherent to such process, method, object or device. Without more restrictions, an element defined by the phrase "including a . . . " does not exclude the presence of another same element in a process, method, article or device that includes the element.

Figure 1:
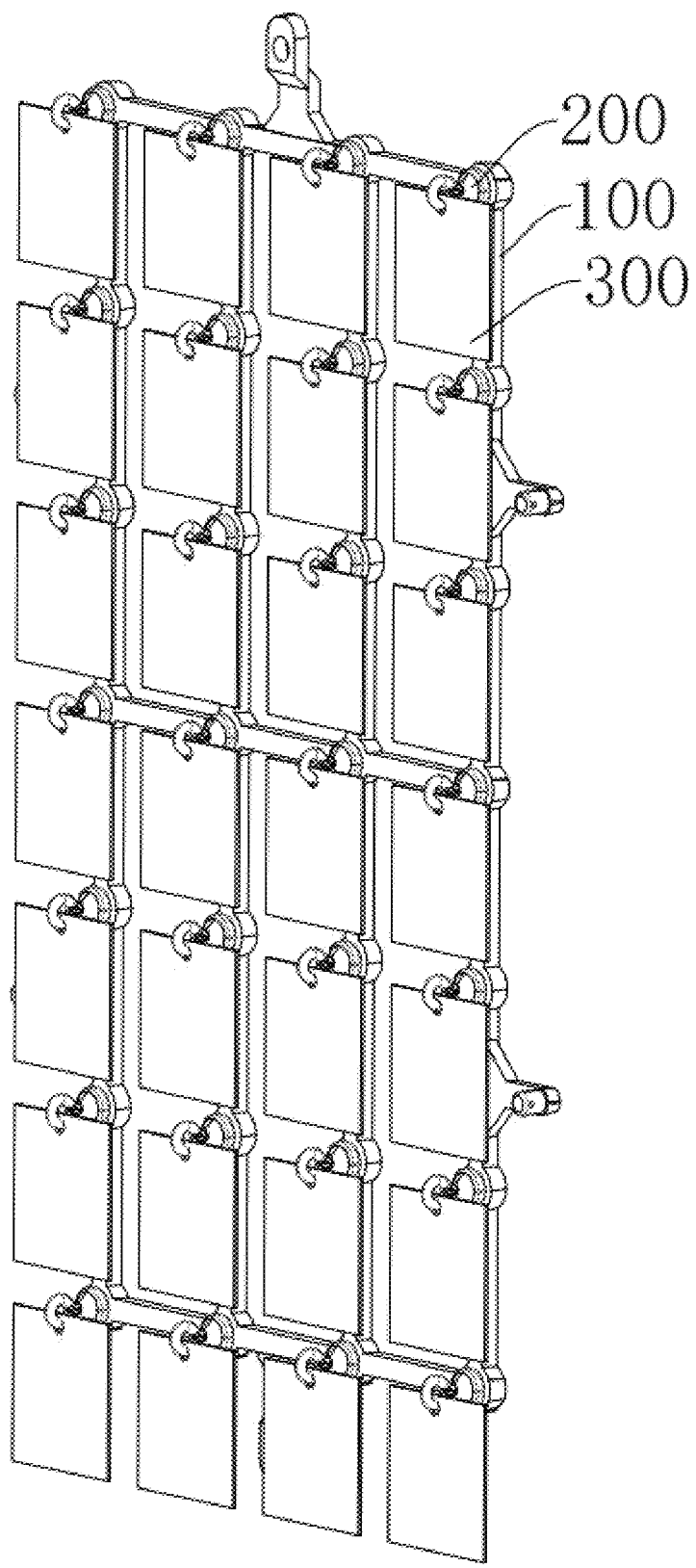
FIG. 1 is a schematic structural diagram of a mounting bracket according to the present invention (showing a wind-driven plate)

As shown in FIG. 1, this embodiment discloses a mounting bracket of a wind-driven plate; the mounting bracket includes a bracket 100 and a plurality of mounting mechanisms 200 arranged on the bracket 100; the mounting mechanisms 200 are used to mount the wind-driven late 300; the wind-driven plate 300 can swing with wind on the mounting mechanisms 200 to produce a dynamic visual effect; and various colors and patterns can be designed on the wind-driven plate 300 according to the requirements of users, which is not limited in this embodiment.

Figure 2:
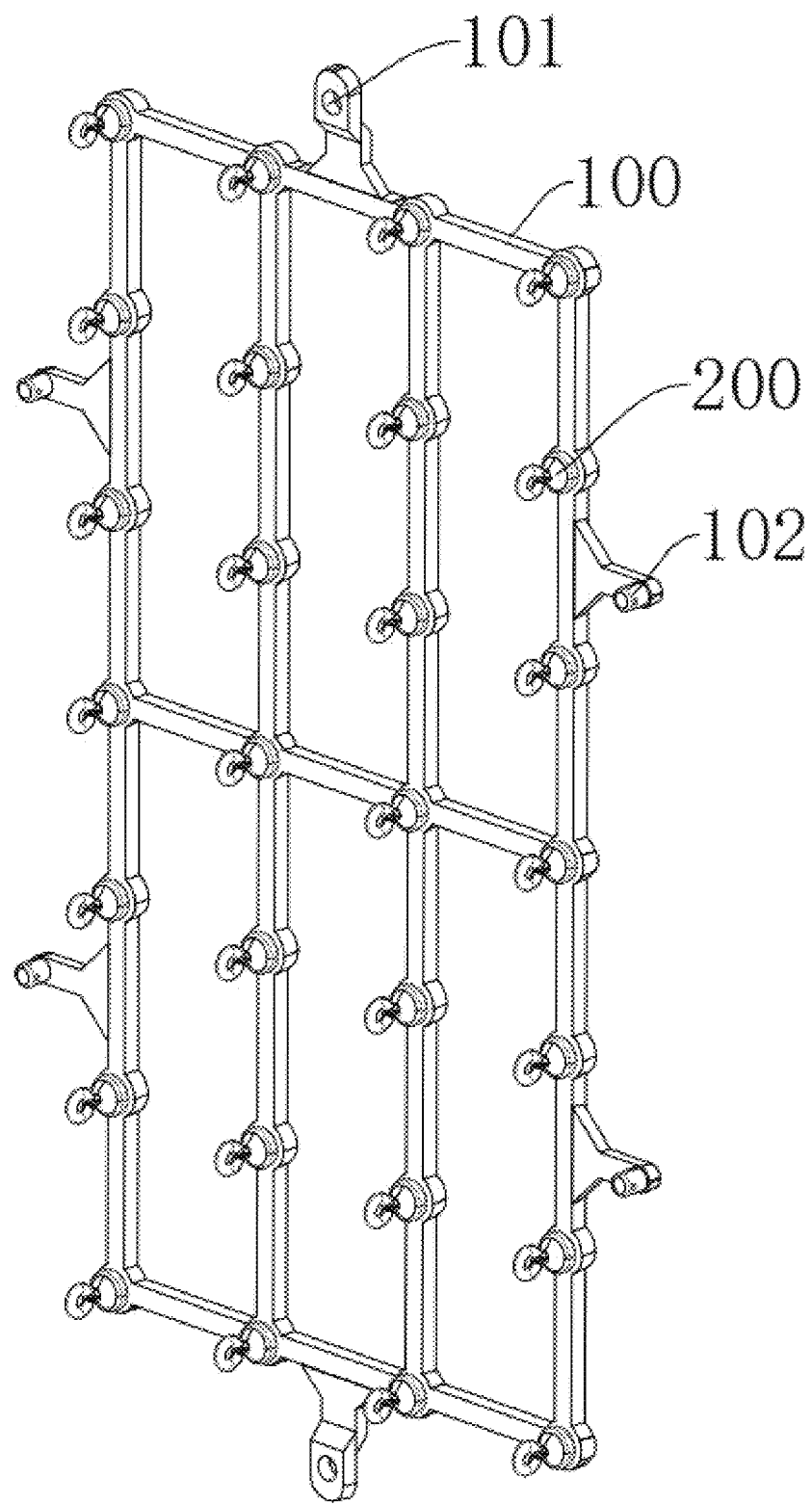
FIG. 2 is a schematic structural diagram of a mounting bracket according to the present invention (not showing a wind-driven plate)

As shown in FIG. 2, the brackets 100 include a plurality of transverse frames and a plurality of vertical frames, and the plurality of transverse frames and the plurality of vertical frames are connected in a staggered manner to form the brackets 100. First pin portions are arranged on the transverse frames of the brackets 100, pin holes 101 are provided in the first pin portions, second pin portions are arranged on the vertical frames of the brackets 100, pins 102 are arranged on the second pin portions, the two adjacent brackets 100 can be spliced together through the cooperation of the pins 102 and the pin holes 101, and the plurality of brackets 100 are spliced into a large bracket structure through the cooperation of the pins 102 and the pin holes 101. In addition, the two adjacent brackets 100 also can be connected through magnetic attraction to form a large bracket structure.

As shown in FIG. 2, a plurality of mounting mechanisms 200 are provided, the specific number is selected according to the actual situation, the plurality of mounting mechanisms 200 are arranged on the brackets 100 in an array manner, and the wind-driven plates 300 are arranged on the mounting mechanisms 200 in a one-to-one correspondence manner.

Figure 3:
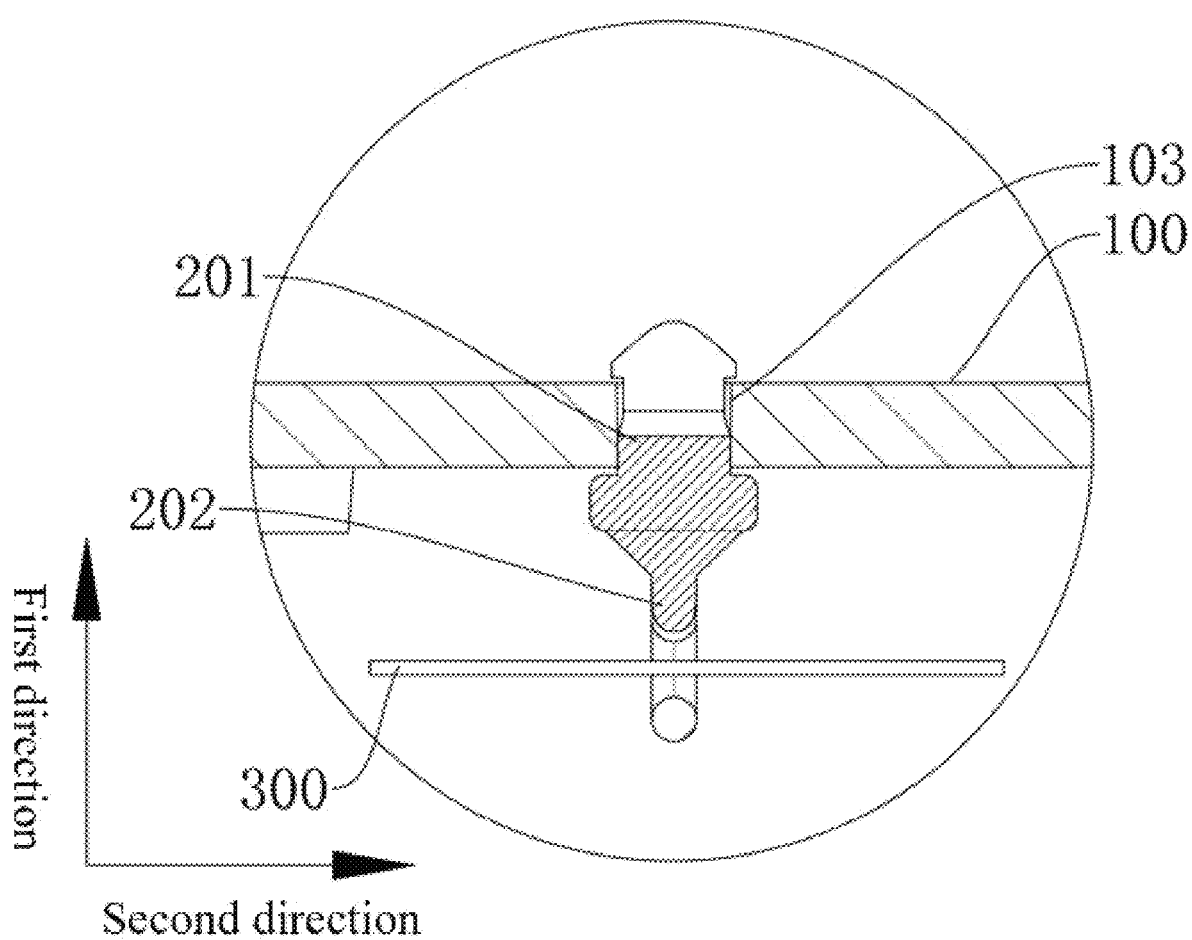
FIG. 3 is a horizontal sectional view of a mounting bracket (showing a partial view)

As shown in FIG. 3, the mounting mechanisms 200 include first connecting pieces 201 and second connecting pieces 202; the first connecting pieces 201 are rotatably arranged on the brackets 100, and the rotatable direction of the first connecting pieces 201 is configured as a first direction; the second connecting pieces 202 are connected to the first connecting pieces 201; when the first connecting pieces 201 rotate, the second connecting pieces 202 can rotate relative to the brackets 100 around the first direction; the second connecting pieces 202 are movably connected to the wind-driven plate 300; and the wind-driven plate 300 can rotate relative to the second connecting pieces 202, and the wind-driven plate 300 can rotate relative to the second connecting pieces 202 around a second direction. In this embodiment, the wind-driven plate 300 can follow the first connecting pieces 201 and the second connecting pieces 202 to rotate around the first direction, the wind-driven plate 300 can rotate around the second direction at the same time, and through two rotating motions of the wind-driven plate 300, the wind-driven plate 300 can be turned over, and a user can convert a front surface or a rear surface of the wind-driven plate 300 into a windward surface according to the requirements. In this embodiment, the first direction and the second direction intersect vertically in a horizontal plane.

As shown in FIG. 3, the first connecting pieces 201 are rotatably connected to the brackets 100. The rotating connection modes include: 1. movable parts (such as bearings and universal joints, which are not shown in this embodiment) are connected between the first connecting pieces 201 and the brackets 100; and 2. the brackets 100 are provided with mounting holes 103 (round through holes) in one-to-one correspondence with the first connecting pieces 201, the axial direction of the mounting holes 103 is configured as the first direction, and the first connecting pieces 201 are coaxially arranged in the mounting holes 103, so that the first connecting pieces 201 can rotate relative to inner walls of the mounting holes 103 around the first direction.

Figure 4:
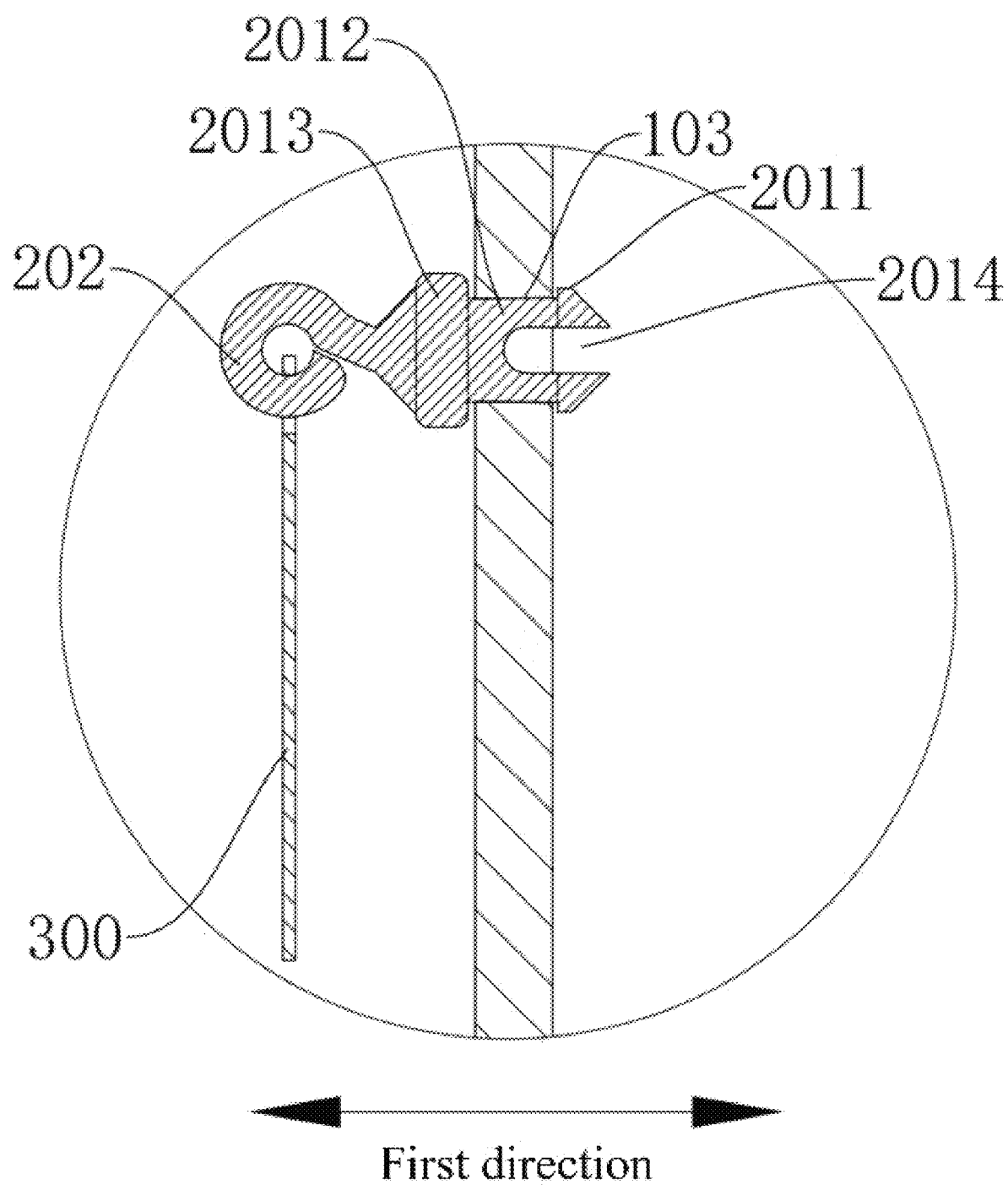
FIG. 4 is a vertical sectional view of a mounting bracket (showing a partial view)

As shown in FIG. 4, the first connecting pieces 201 include first limiting portions 2011, rotating portions 2012 and second limiting portions 2013 which are connected sequentially in the first direction, where the first limiting portions 2011 are located at an end away from the wind-driven plate 300, and the second limiting portions 2013 are movably connected to the wind-driven plate 300. The outer diameters of the first limiting portions 2011 and the second limiting portions 2013 are greater than the inner diameters of the mounting holes 103, the rotating portions 2012 (cylindrical) penetrate into the mounting holes 103 in the first direction, and the first limiting portions 2011 and the second limiting portions 2013 respectively abut against two side surfaces of the brackets 100, thereby avoiding the offset of the front and rear positions of the first connecting pieces 201 in the first direction. In some preferred embodiments, the first limiting portions 2011, the rotating portions 2012 and the second limiting portions 2013 are integrally formed.

As shown in FIG. 4, an end of each of the first limiting portions 2011 away from the rotating portions 2012 is configured as a tapered end, a tip part of the tapered end is away from the rotating portions 2012, and when the first limiting portions 2011 in this embodiment are mounted on the brackets 100, the tapered end can face toward the mounting holes 103 and pass through the mounting holes 103 in the first direction, so that the rotating portions 2012 of the first connecting pieces 201 can penetrate into the mounting holes 103, and the mounting convenience of the first connecting pieces 201 can be improved. In some embodiments, the first connecting pieces 201 are overally made of an elastic material, such as rubber, silica gel and polyurethane.

As shown in FIG. 4, in some preferred embodiments, the first limiting portions 2011 and at least part of the rotating portions 2012 are provided with U-shaped notch grooves 2014; and in the axial direction of the first limiting portions 2011 (that is, the first direction), the notch grooves 2014 extend from the middle positions of the rotating portions 2012 to the first limiting portions 2011 and penetrate through the first limiting portions 2011. In this embodiment, the notch grooves 2014 are designed, so that the first limiting portions 2011 have a certain folding margin; a worker presses the first limiting portions 2011 to reduce the outer diameters of the first limiting portions 2011 when mounting the first connecting pieces 201, the first limiting portions can pass through the mounting holes 103 after the outer diameters of the first limiting portions 2011 is reduced, and the outer diameters can be restored to a natural state after the first limiting portions 2011 pass through the mounting holes 103.

Figure 5:
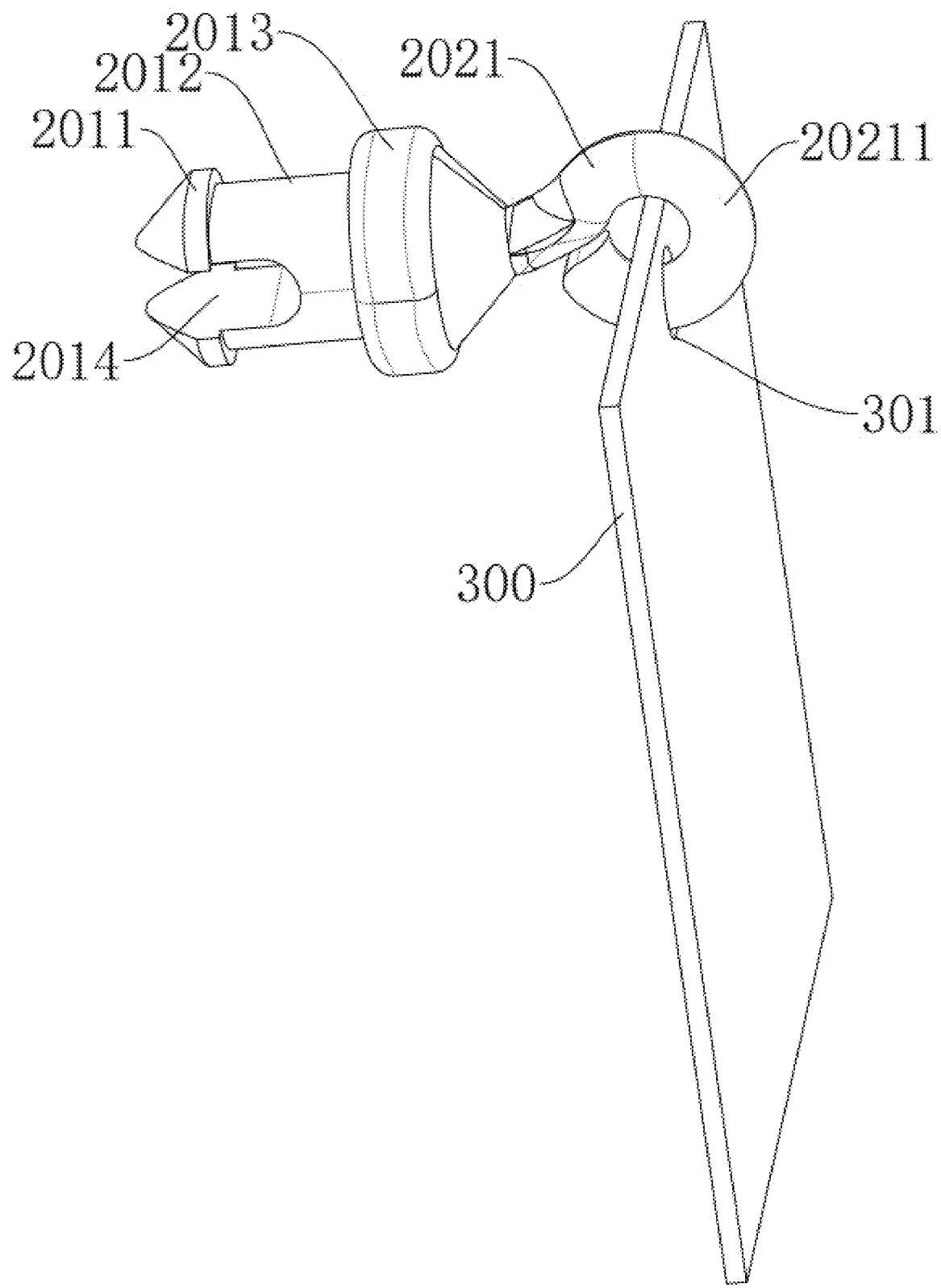
FIG. 5 is a schematic structural diagram of a mounting mechanism and a wind-driven plate.

The second connecting pieces 202 are used to connect the wind-driven plate 300. In this embodiment, the second connecting pieces 202 include the following two forms:

1. As shown in FIG. 5, the second connecting pieces 202 include hook portions 2021, an end of each of the hook portions 2021 is connected to the second limiting portions 2013 of the first connecting pieces 201, the wind-driven plate 300 is provided with a connecting hole 301, the hook portions 2021 penetrate into the connecting hole 301, at least part of the hook portions 2021 extend around the second direction and can form a C-shaped ring portion 20211, and the wind-driven plate 300 can be turned over 180 degrees in the extending direction of the C-shaped ring portion 20211

(that is, the wind-driven plate 300 can rotate around the second direction), so that the wind-driven plate 300 can be turned over and can be hung on the C-shaped ring portion 20211 through the connecting hole 301 after being turned over; and the C-shaped ring portion 20211 forms an incomplete closed structure, so the connecting hole 301 of the wind-driven plate 300 can be hooked from one end of the C-shaped ring portion 20211 (that is, the tip of the hook portion 2021) and hung on the C-shaped ring portion 20211. The inner diameter of the C-shaped ring portion 20211 can meet the requirement that the wind-driven plate 300 hung on the C-shaped ring portion 20211 swings with the wind to produce a dynamic visual effect.

Figure 6:
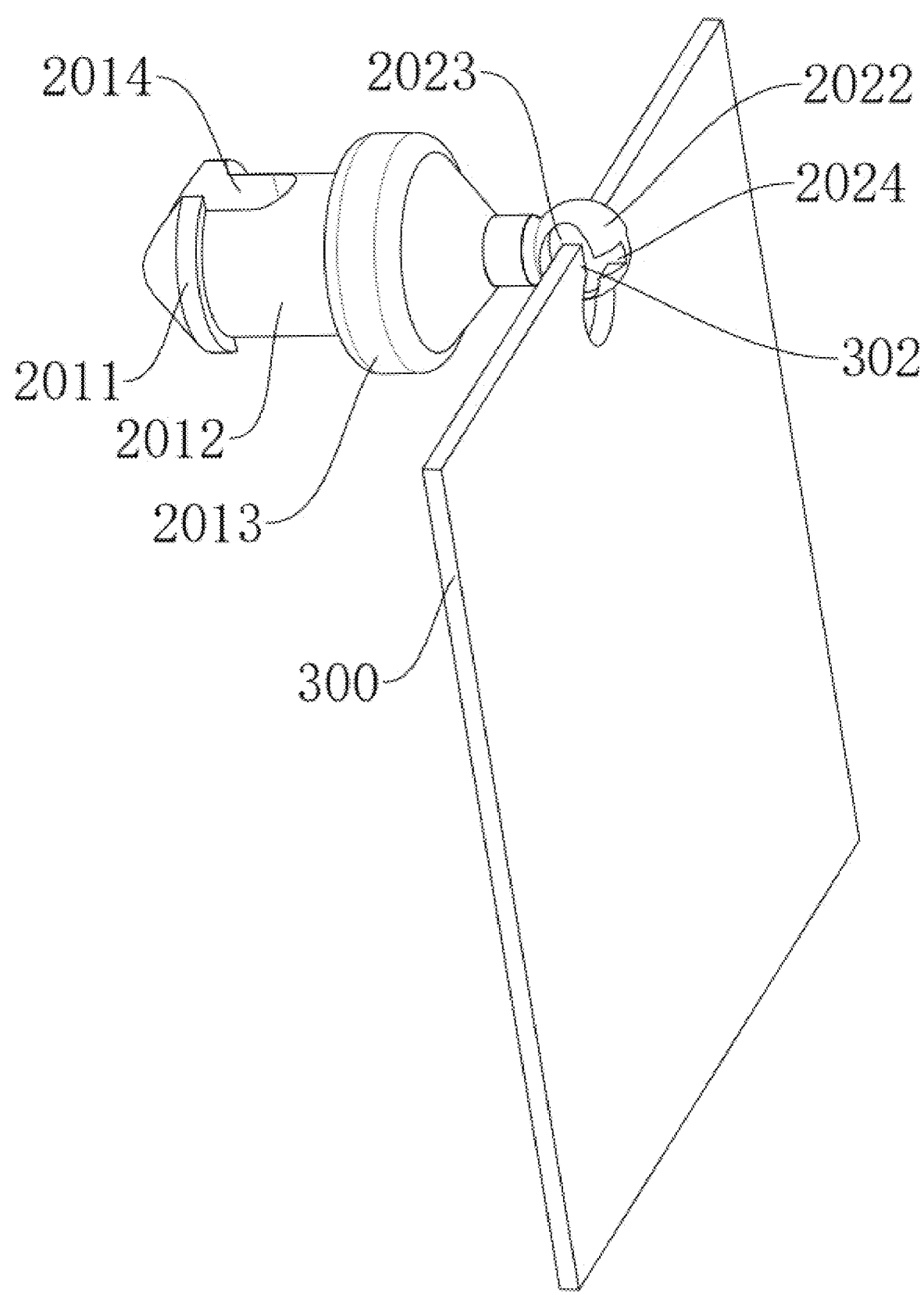
FIG. 6 is another schematic structural diagram of a mounting mechanism and a wind-driven plate.
Figure 7:
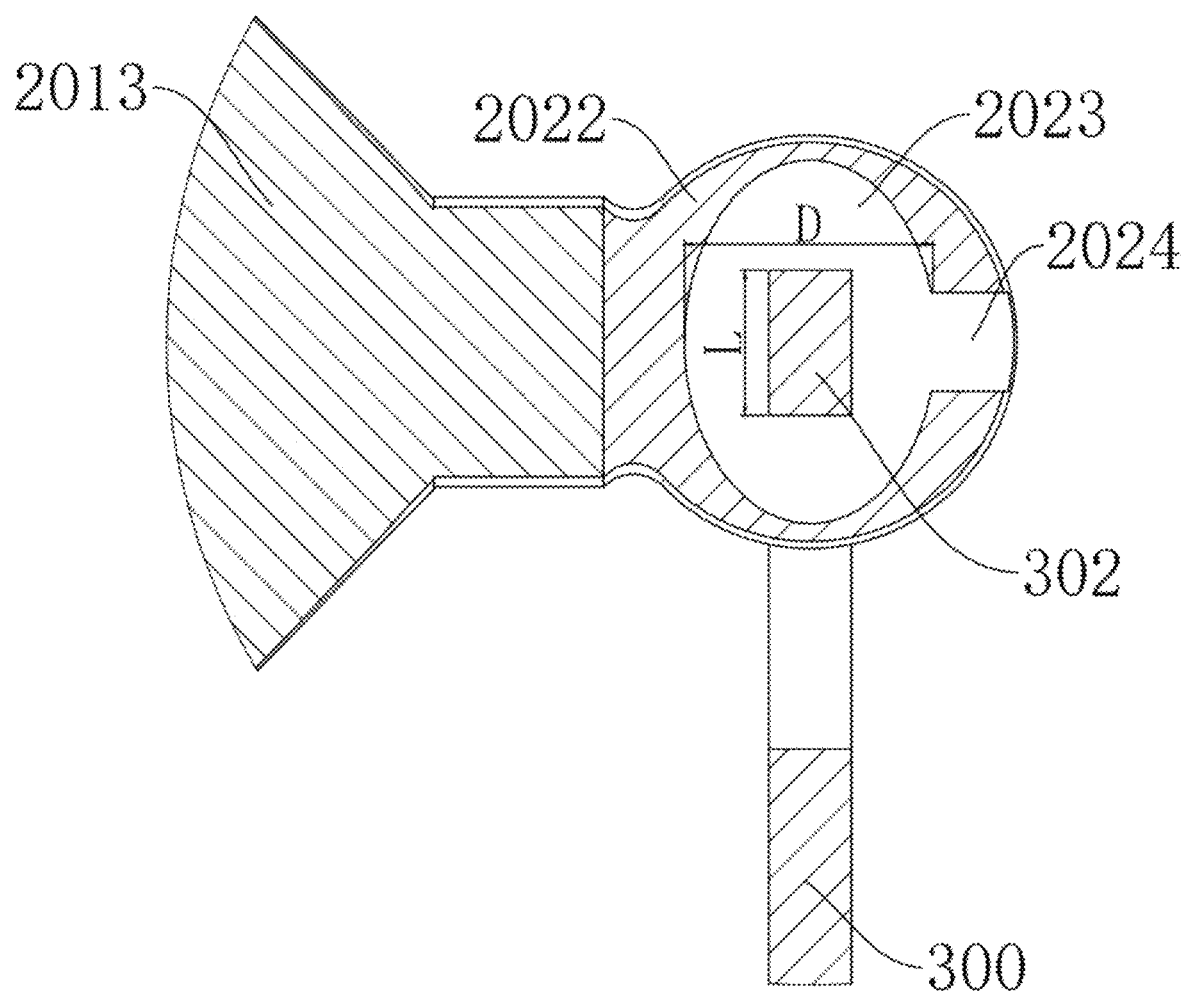
FIG. 7 is a vertical sectional view of FIG. 6 (showing a partial view)
Figure 8:
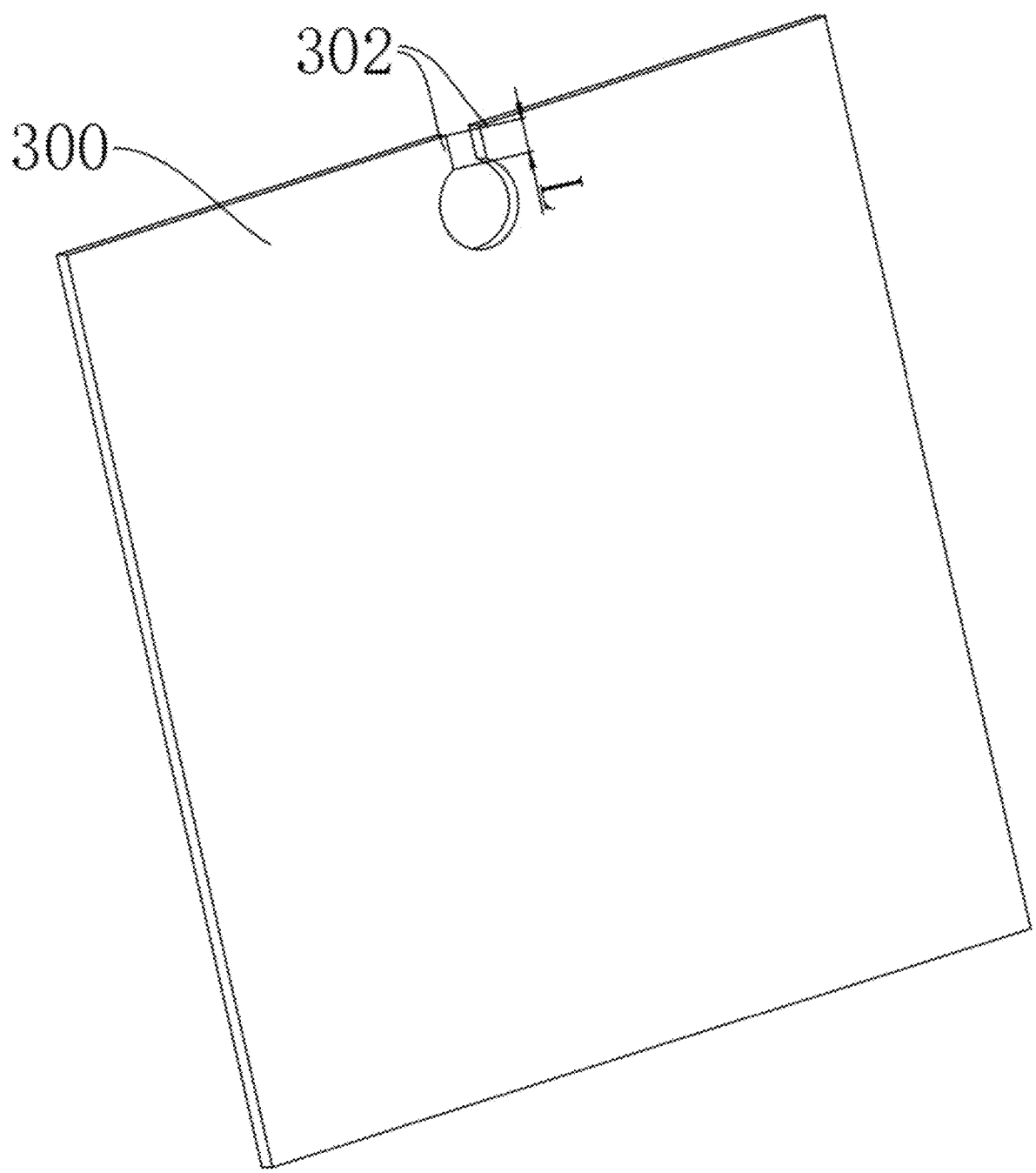
FIG. 8 is a schematic structural diagram of the wind-driven plate in FIG. 6.

2. As shown in FIG. 6 to FIG. 8, the second connecting pieces 202 include sphere portions 2022, and an end of each of the sphere portions 2022 is connected to the second limiting portions 2013 of the first connecting pieces 201; rotating blind grooves 2023 are arranged at two sides of the sphere portions 2022; in the second direction, the two rotating blind grooves 2023 are respectively located on two sides of the sphere portions 2022, and the depth direction of the rotating blind grooves 2023 is configured as the second direction; and two inserting lugs 302 in one-to-one correspondence with the rotating blind grooves 2023 are arranged on the wind-driven plate 300 at intervals, the inserting lugs 302 are inserted in the rotating blind grooves 2023, the minimum inner diameter D of the rotating blind grooves 2023 is greater than the width L of the inserting lugs 302 (for example, the minimum inner diameter is 1.5 to 3 times the width of the inserting lugs), so that the inserting lugs 302 can rotate relative to the rotating blind grooves 2023 around the second direction, and the inserting lugs 302 also can be deflected relative to the rotating blind grooves 2023, so that the wind-driven plate 300 can rotate around the second direction and swing with the wind to achieve the turning of the wind-driven plate 300 and produce the dynamic visual effect. In some preferred embodiments, the outline of the rotating blind grooves 2023 is elliptical in the second direction, the short-axis direction of the elliptical rotating blind grooves 2023 is parallel to the first direction, and the short-axis length of the elliptical rotating blind grooves 2023 is configured as the minimum inner diameter D of the rotating blinding grooves 2023.

In some preferred embodiments, as shown in FIG. 7 and FIG. 8, the sphere portions 2022 are provided with sockets 2024 communicating with the rotating blind grooves 2023 in the first direction, the sockets 2024 communicate with the rotating blind grooves 2023 in a one-to-one correspondence manner, the extending direction of the sockets 2024 is parallel to the first direction, and the inserting lugs 302 of the wind-driven plate 300 can be inserted into the sockets 2024 in the first direction and pass through the sockets 2024 to fall into the rotating blind grooves 2023.

Figure 9:
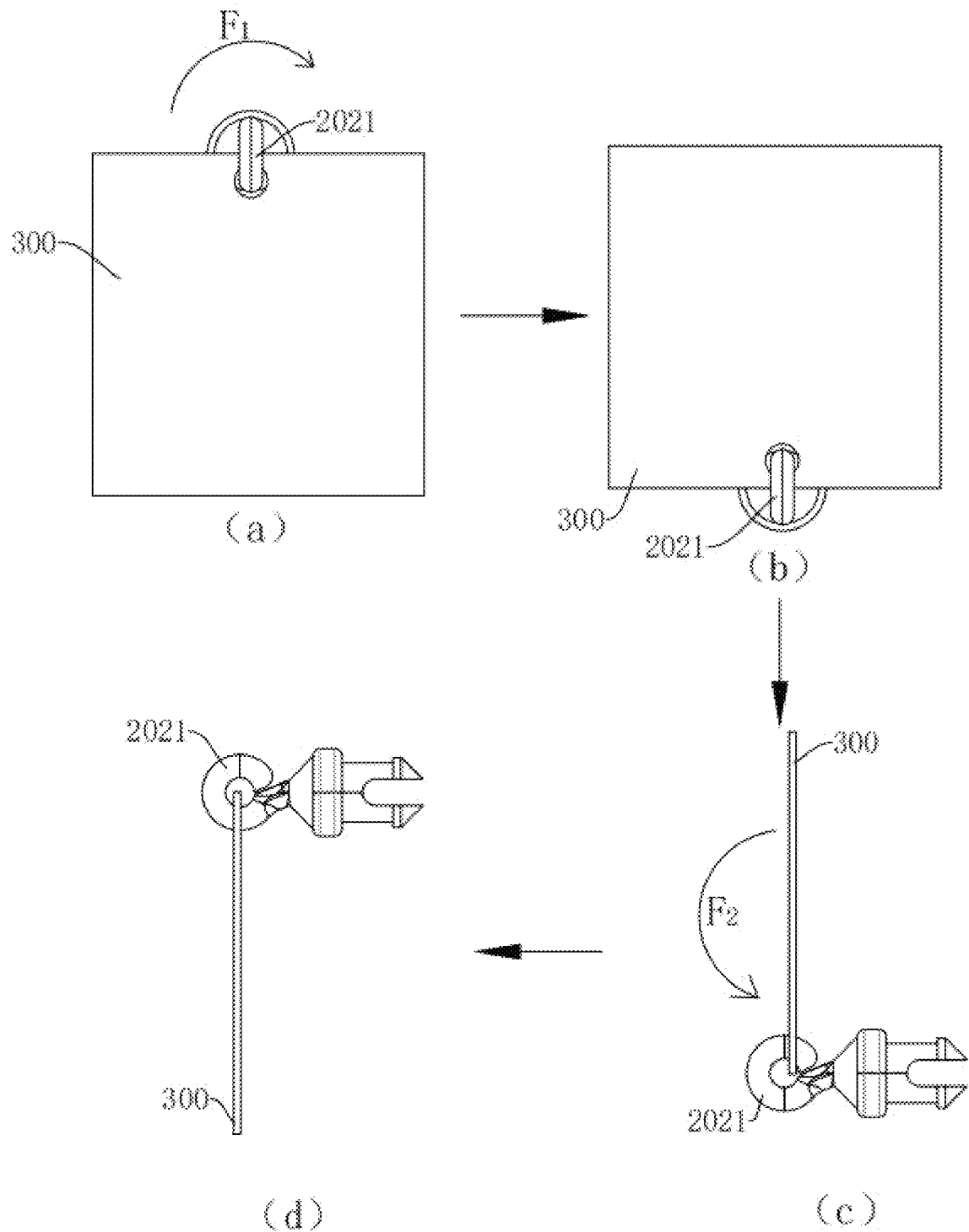
FIG. 9 is a schematic diagram of a turning action process of a wind-driven plate.
Figure 10:
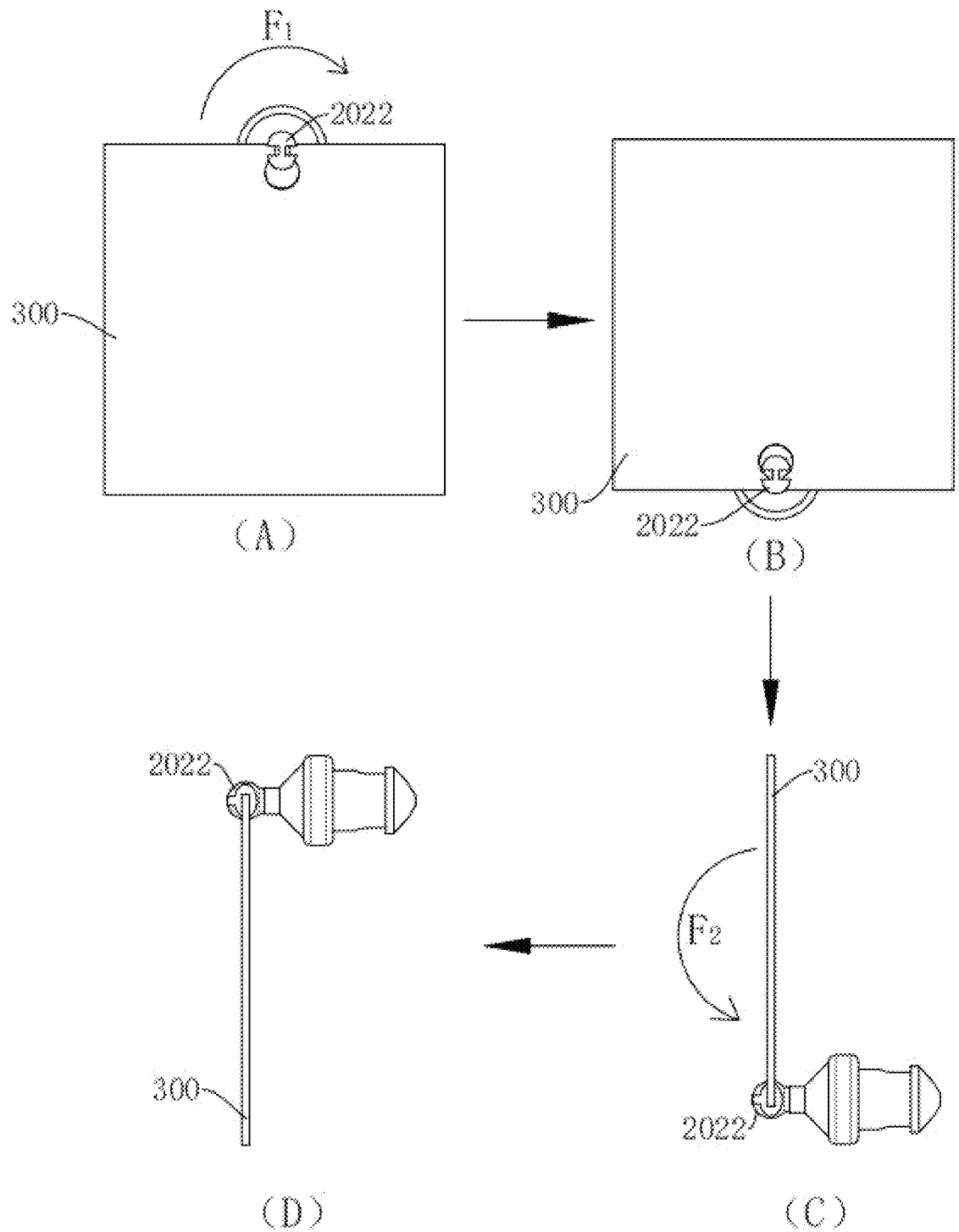
FIG. 10 is another schematic diagram of a turning action process of a wind-driven plate.

The working principle of the mounting bracket of this embodiment is as follows:

if it is necessary to turn over a certain wind-driven plate 300, the wind-driven plate 300 is required to be rotated twice:

the first rotation: a worker rotates the second connecting pieces 202, so that the first connecting pieces 201, the second connecting pieces 202 and the wind-driven plate 300 arranged on the second connecting pieces 202 overally rotate 180 degrees around the first direction;

since there are two forms of second connecting pieces 202 in this embodiment, the second rotation of the wind-driven plate 300 has two forms:

the first (form of hook portions), as shown in FIG. 9, after the first rotation is completed (the arrow F1 shows the first rotation direction of the wind-driven plate), the connecting hole 301 on the wind-driven plate 300 moves relative to the C-shaped ring portion 20211 on the hook portions 2021, and the wind-driven plate 300 rotates 180 degrees from top to bottom around the second direction in the extending direction of the C-shaped ring portion 20211, so that the second rotation is achieved (the arrow F2 shows the second rotation direction of the wind-driven plate), and the turning of the wind-driven plate 300 is achieved through two rotations of the wind-driven plate 300; and the second (form of sphere portions), as shown in FIG. 10, after the first rotation is completed (the arrow F1 shows the first rotation direction of the wind-driven plate), the inserting lugs 302 on the wind-driven plate 300 rotate relative to the inner walls of the rotating blind grooves 2023 around the second direction, and at this time, the wind-driven plate 300 rotates 180 degrees from top to bottom, so that the second rotation is achieved (the arrow F2 shows the second rotation direction of the wind-driven plate), and the turning of the wind-driven plate 300 is achieved through two rotations of the wind-driven plate 300.

The foregoing descriptions are merely specific embodiments of the present invention. Those skilled in the art can clearly understand that to describe conveniently and concisely, for a specific working process of the system, module and unit described above, refer to the corresponding process in the foregoing method embodiments. Details are not described herein again. It should be understood that the protection scope of the present invention is not limited to this. Any equivalent modification or replacement readily figured out by a person skilled in the art within the technical scope disclosed in the present invention shall fall within the protection scope of the present invention.

What is claimed is:

1. A mounting bracket of a wind-driven plate, comprising a frame and a plurality of mounting mechanisms arranged on the frame, wherein the mounting mechanisms comprise first connecting pieces and second connecting pieces; the first connecting pieces are rotatably arranged on the frame around a first direction; the second connecting pieces are connected to the first connecting pieces; the second connecting pieces are movably connected to the wind-driven plate; the wind-driven plate is capable of rotating on the second connecting pieces around a second direction; and the first direction and the second direction intersect in a plane;

wherein the second connecting pieces comprise sphere portions, and an end of each of the sphere portions is connected to the first connecting pieces; and rotating blind grooves are provided at two ends of the sphere portions in the second direction, inserting lugs in one-to-one correspondence with the rotating blind grooves are arranged on the wind-driven plate at intervals, and the minimum inner diameter of the rotating blind grooves is greater than the widths of the inserting lugs, so that the wind-driven plate and the inserting lugs are capable of rotating around the second direction.

2. The mounting bracket according to claim 1, characterized in that the frame is provided with pin holes and pins.

3. The mounting bracket according to claim 1, wherein the plurality of mounting mechanisms are arranged on the frame in an array manner.

4. The mounting bracket according to claim 3, wherein the frame is provided with mounting holes, and the first connecting pieces of the mounting mechanisms are rotatably arranged in the mounting holes.

5. The mounting bracket according to claim 4, characterized in that the first connecting pieces comprise first limiting portions, rotating portions and second limiting portions which are connected sequentially; the outer diameters of the first limiting portions and the second limiting portions are greater than the inner diameters of the mounting holes; the rotating portions are rotatably arranged in the mounting holes; and the second limiting portions are connected to the second connecting pieces.

6. The mounting bracket according to claim 5, characterized in that an end of each of the first limiting portions away from the rotating portions is configured as a tapered end.

7. The mounting bracket according to claim 5, characterized in that the limiting portions are provided with notch grooves in the axial direction of the first limiting portions, and the notch grooves at least partially extend into the rotating portions.

8. The mounting bracket according to claim 1, characterized in that the second connecting pieces comprise hook portions, an end of each of the hook portions is connected to the first connecting pieces, the hook portions penetrate through a connecting hole on the wind-driven plate, and at least part of the hook portions extend around the second direction, so that the wind-driven plate is capable of rotating around the second direction in extending directions of the hook portions.

9. The mounting bracket according to claim 1, characterized in that the sphere portions are provided with sockets communicating with the rotating blind grooves in the first direction, and the sockets are used for the inserting lugs to be inserted into the rotating blind grooves.

* * * * *